United States Patent
Senga et al.

(10) Patent No.: US 7,317,072 B2
(45) Date of Patent: Jan. 8, 2008

(54) PROCESS FOR THE PRODUCTION OF POLYARYLENE SULFIDE RESINS

(75) Inventors: Minoru Senga, Chiba (JP); Koichi Suga, Chiba (JP); Tomio Ohno, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 116 days.

(21) Appl. No.: 10/530,027

(22) PCT Filed: Oct. 2, 2003

(86) PCT No.: PCT/JP03/12667

§ 371 (c)(1), (2), (4) Date: Sep. 22, 2006

(87) PCT Pub. No.: WO2004/033535

PCT Pub. Date: Apr. 22, 2004

(65) Prior Publication Data

US 2006/0128819 A1    Jun. 15, 2006

(30) Foreign Application Priority Data

Oct. 10, 2002    (JP) .............................. 2002-297656

(51) Int. Cl.
     *C08F 6/00*    (2006.01)
(52) U.S. Cl. ...................... 528/491; 264/101; 264/103; 264/143; 264/155; 264/500; 264/511; 524/493; 524/494; 524/495; 528/388
(58) Field of Classification Search ................ 264/101, 264/103, 143, 155, 500, 511; 524/493, 494, 524/495; 528/388, 491
See application file for complete search history.

(56) References Cited

U.S. PATENT DOCUMENTS

| | | |
|---|---|---|
| 3,707,528 A | 12/1972 | Miles |
| 4,748,231 A | 5/1988 | Nesheiwat |
| 5,247,063 A | 9/1993 | Alewelt et al. |
| 5,898,061 A | 4/1999 | Sase et al. |

FOREIGN PATENT DOCUMENTS

| | | |
|---|---|---|
| JP | 61-228023 | 10/1986 |
| JP | 5-43690 | 2/1993 |
| JP | 5-186593 | 7/1993 |
| JP | 6-192423 | 7/1994 |
| JP | 6-192424 | 7/1994 |
| JP | 10-507223 | 7/1998 |
| JP | 2002-533546 | 10/2002 |

*Primary Examiner*—Terressa Boykin
(74) *Attorney, Agent, or Firm*—Oblon, Spivak, McClelland, Maier & Neustadt, P.C.

(57) ABSTRACT

The present invention is a process for the production of polyarylene sulfide based resin, wherein in washing a polyarylene sulfide based resin with a mixed solvent of an aprotic organic solvent and water in a softened or molten state, the polyarylene sulfide based resin partially dissolved in the washing liquid is recovered, to be specific, the polyarylene sulfide based resin dissolved in the washing liquid is precipitated, separated and recovered by cooling the washing liquid after washing and/or adding water to the washing liquid, and it is reused. According to the present invention, capable of being provided is a process for the production of polyarylene sulfide based resin in which the polyarylene sulfide based resin formed by polymerization is scarcely lost in washing the above resin with a solvent.

16 Claims, 1 Drawing Sheet

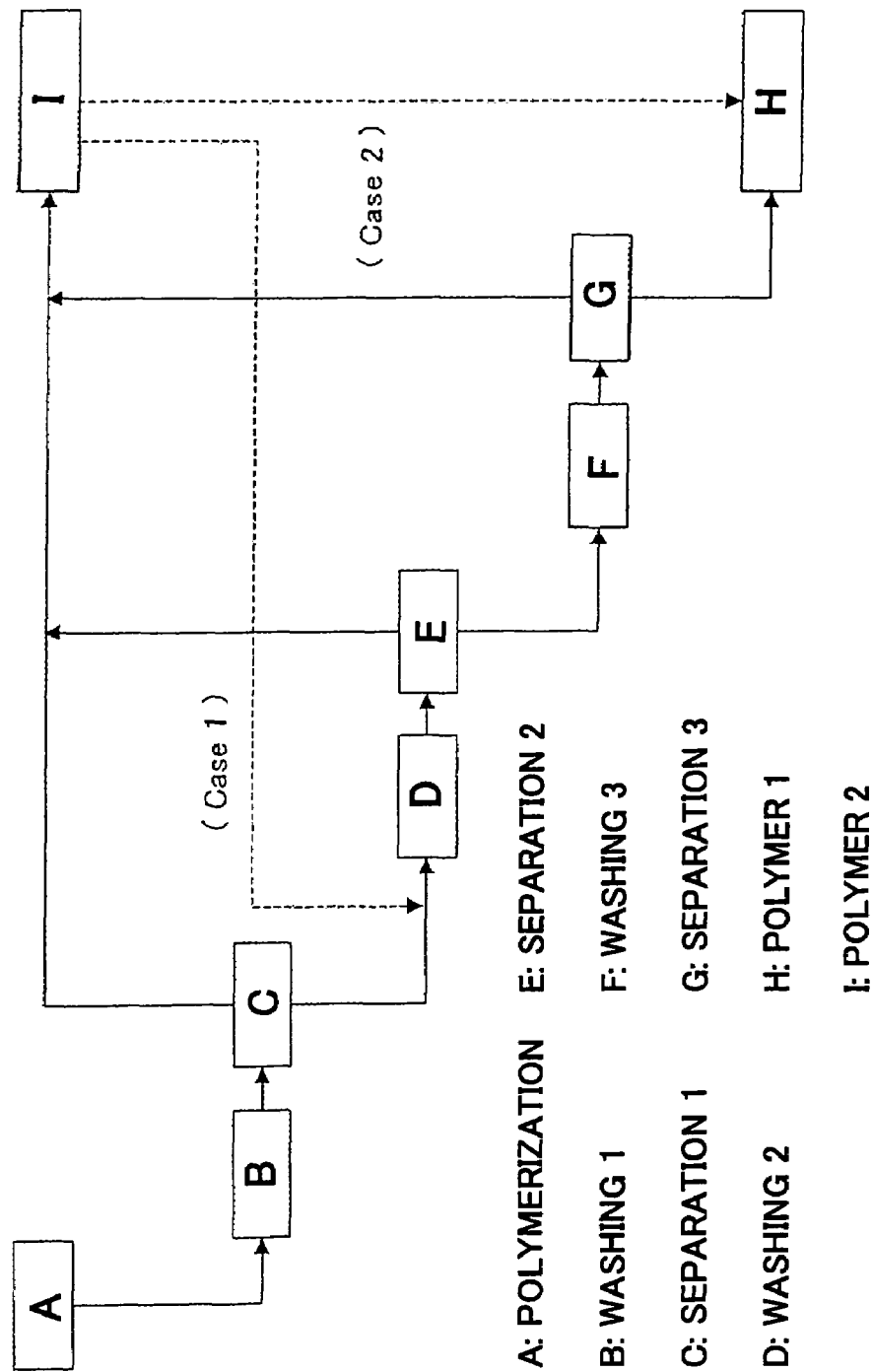

PROCESS FOR THE PRODUCTION OF POLYARYLENE SULFIDE RESINS

TECHNICAL FIELD

The present invention relates to a process for the production of polyarylene sulfide resins. More specifically the present invention relates to a process for the production of polyarylene sulfide based resin in which in washing the polyarylene sulfide based resin formed by polymerization with a solvent, the resin partially dissolved in the solvent is recovered and reused to thereby raise a yield of the resin.

BACKGROUND ART

Polyarylene sulfide based resins (hereinafter referred as a "PAS based resin"), particularly polyphenylene sulfide based resins (hereinafter referred as a "PPS based resin") out of them are known as engineering plastics which are excellent in a mechanical strength, a heat resistance, a flame retardancy and a solvent resistance and which have good electrical characteristics and a high rigidity, and they are widely used as various materials such as materials for electronic and electric equipment parts and the like.

A process in which a dihalogenated aromatic compound such as p-dichlorobenzene is reacted with a sodium salt such as sodium sulfide in an aprotic organic solvent such as N-methyl-2-pyrrolidone (hereinafter referred as the "NMP") has so far usually been used for producing the above resins. In the above process, however, sodium halide is by-produced, and this sodium halide is introduced into the resin since it is insoluble in the solvent such as NMP and the like. Accordingly, it has been impossible to sufficiently remove sodium halide contained in a PAS based resin even when the resin is washed with a large amount of water after polymerization.

Accordingly, attentions have been paid to polymerization carried out using a lithium salt in place of a sodium salt. Lithium halide by-produced during polymerization is soluble in a lot of aprotic organic solvents (solvents for polymerization) such as NMP, and therefore it becomes possible to relatively readily reduce a concentration of lithium contained in the resin. However, by-produced lithium halide remains in a PAS based resin as an impurity, and it has been impossible to sufficiently remove it even when washed with a large amount of water after polymerization.

A method in which a polyarylene sulfide based resin staying in a softened or molten state is washed with a solvent such as an organic amide-water mixed solvent and the like is proposed as a method for effectively removing alkali metal halides by-produced in producing a polyarylene sulfide resin (refer to, for example, Japanese Unexamined Patent Application Laid-Open No. 228023/1986 and Japanese Unexamined Patent Application Laid-Open No. 207027/1995). In the above washing methods, however, although alkali metal halides can effectively be removed, a part of the polyarylene sulfide resin is dissolved in the liquid phase together with the alkali metal halides, and therefore the problem that the polyarylene sulfide resin obtained is reduced in a yield has been involved therein.

The present inventors have proposed a method in which a solvent saturated with a PAS based resin is used as a washing liquid for the purpose of overcoming the above problem (refer to Japanese Unexamined Patent Application Laid-Open No. 273174/2000). However, when the above method is applied to an actual production process, involved therein are the problems that it is difficult to control a flow amount of a washing liquid in a washing step and that pipelines in a production apparatus are complicated. Further, according to the above method, a loss in a PAS based resin is reduced, but there has been the problem that a part of the PAS based resin is dissolved in the washing liquid and lost together with the washing liquid, so that the satisfactory yield is not necessarily obtained.

DISCLOSURE OF THE INVENTION

The present invention has been made in light of the problems described above, and an object thereof is to provide a process for the production of polyarylene sulfide based resin in which the polyarylene sulfide based resin is scarcely lost in washing the above resin with a solvent.

Intensive researches repeated by the present inventors in order to solve the problems described above have resulted in finding that the dissolved polyarylene sulfide based resin can be separated and recovered by cooling a washing liquid used for washing the polyarylene sulfide based resin and/or adding water to the washing liquid, and thus the present invention has been completed based on such knowledge.

That is, the summary of the present invention comprises the following contents.

(1) A process for the production of polyarylene sulfide based resin comprising a step of washing a polyarylene sulfide based resin in a softened or molten state with a mixed solvent of an aprotic organic solvent and water, wherein the polyarylene sulfide based resin partially dissolved in the washing liquid is recovered and reused.

(2) The process for the production of polyarylene sulfide based resin as described the above item (1), wherein a recovery of the polyarylene sulfide based resin dissolved in the washing liquid is carried out after precipitating and separating by at least one selected from cooling the washing liquid after washing or adding water to the washing liquid.

(3) The process for the production of polyarylene sulfide based resin as described in the above item (2), which further comprises the steps of adding another polyarylene sulfide based resin; and washing with a mixed solvent of an aprotic organic solvent and water in a softened or molten state.

(4) The process for the production of polyarylene sulfide based resin as described in the above item (2), which further comprises the steps of crushing the recovered polyarylene sulfide based resin; drying them; and reusing in the form of powder.

BRIEF DESCRIPTION OF THE DRAWING

FIG. 1 is a flow diagram showing a continuous process of polymerization and washing in which the present invention is applied.

BEST MODE FOR CARRYING OUT THE INVENTION

In the production process of the present invention, a polyarylene sulfide based resin (PAS based resin) has to be washed in a softened or molten state, and when the PAS based resin staying in a solidified state is washed, there is the inconvenience that impurities such as alkali metal halides and the like are not sufficiently removed.

The PAS based resin to which the production process of the present invention can be applied shall not specifically be restricted and includes, for example, polyarylene sulfide based resins obtained by subjecting p-dichlorobenzene and a sulfur source to polycondensation reaction in an organic polar solvent by a publicly known method. In general, known as the PAS based resin are resins having a molecular structure which is substantially linear and does not have branched or cross-linked structures and resins having branched and cross-linked structures depending on the production processes thereof, and either of the above types is effective in the present invention. The PAS based resin includes the homopolymers or the copolymers containing 70 mole % or more, preferably 80 mole % or more of a para-arylene sulfide unit as a repetitive unit. The copolymer structural unit includes, for example, a meta-phenylene sulfide unit, an ortho-phenylene sulfide unit, a p,p'-diphenyleneketone sulfide unit, a p,p'-diphenylenesulfone sulfide unit, a p,p'-biphenylene sulfide unit, a p,p'-diphenyleneether sulfide unit, a p,p'-diphenylenemethylne sulfide unit, a p,p'-diphenylenecumenyl sulfide unit and a naphthyl sulfide unit. In addition to the substantially linear polymers described above, branched or cross-linked polyarylene sulfides obtained by polymerizing with a small amount of a monomer having three or more functional groups as a part of the monomer or blended polymers obtained by blending the above polymers with the linear polymers described above can also be objects for applying the production process of the present invention.

The PAS based resin to which the production process of the present invention is applicable can be obtained by reacting a dihalogenated aromatic compound and metal sulfide in a polar organic solvent.

The dihalogenated aromatic compound used for producing the above PAS bases resin includes, for example, dihalogenated benzenes such as m-dihalobenzene and p-dihalobenzene; dihalogenated alkyl-substituted benzenes or dihalogenated cycloalkyl-substituted benzenes such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene, 1-n-hexyl-2,5-dihalobenzene and 1-cyclohexyl-2,5-dihalobenzene; dihalogenated aryl-substituted benzenes such as 1-phenyl-2,5-dihalobenzene, 1-benzyl-2,5-dihalobenzene and 1-p-toluyl-2,5-dihalobenzene; dihalogenated biphenyls such as 4,4'-dihalobiphenyl; and dihalogenated naphthalenes such as 1,4-dihalonaphthalene, 1,6-dihalonaphthalene and 2,6-dihalonaphthalene.

Metal sulfides represented by alkali metal compounds such as sodium sulfide, lithium sulfide and potassium sulfide can mainly be used as the metal sulfide used for producing the above PAS based resin. They may be used alone or in a mixture of two or more kinds thereof. Also, they can be used in combination with alkali earth metal sulfides and other sulfur sources.

In general, aprotic polar organic compounds (for example, amide compounds, lactam compounds, urea compounds, organic sulfur compounds and cyclic organic phosphorus compounds) can be used as the aprotic organic solvent used for the present invention in the form of a single solvent or a mixed solvent.

Among the above aprotic organic solvent, examples of the amide compounds described above include N,N-dimethylformamide, N,N-diethylformamide, N,N-dimethylacetamide, N,N-diethylacetamide, N,N-dipropylacetamide and N,N-dimethylbenzoamide.

Examples of the above lactam compounds include caprolactam, N-alkylcaprolactams such as N-methylcaprolactam, N-ethylcaprolactam, N-isopropylcaprolactam, N-isobutyl-caprolactam, N-n-propylcaprolactam, N-n-butycaprolactam and N-cyclohexylcaprolactam, N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone and N-methyl-3-ethyl-2-piperidone.

Examples of the above urea compounds include tetramethylurea, N,N'-dimethylethyleneurea and N,N'-dimethylpropyleneurea.

Further, examples of the above organic sulfur compounds include dimethyl sulfoxide, diethyl sulfoxide, diphenylsulfolane, 1-methyl-1-oxosulfolane, 1-ethyl-1-oxosulfolane and 1-phenyl-1-oxosulfolane. Also, examples of the above cyclic organic phosphorus compounds include 1-methyl-1-oxophosphorane, 1-n-propyl-1-oxophosphorane and 1-phenyl-1-oxophosphorane.

The above various aprotic polar organic compounds each can be used as the aprotic organic solvent described above alone or in a mixture of two or more kinds thereof and further in a mixture with other solvent components which do not hinder the object of the present invention.

Among the various aprotic organic solvents described above, N-alkylcaprolactams and N-alkylpyrrolidones are preferred, and N-methyl-2-pyrrolidone is particularly preferred.

In the present invention, a fixed proportion of water has to be added as a washing solvent together with the aprotic organic solvent in order to control a solubility of the PAS based resin, and the mixed solvent of the aprotic organic solvent described above and water is used for washing the PAS based resin. Water used by mixing with the aprotic organic solvent shall not be specifically restricted, and distilled water is preferred. A mixing ratio of the aprotic organic solvent to water is preferably 55/45 to 95/5, particularly preferably 65/35 to 90/10 and further preferably 70/30 to 85/15 in terms of a mass ratio (aprotic organic solvent/water).

When a mixing ratio of water exceeds 45 mass %, the PAS based resin is less liable to become a softened or molten state, and there is the anxiety that the PAS based resin is solidified. On the other hand, when a mixing ratio of water is less than 5 mass %, all part of the PAS based resin is dissolved and turned into a homogeneous solution, so that it can not be washed.

In respect to a concentration of the PAS based resin in washing, the PAS based resin to be washed is preferably 10 to 400 g, particularly preferably 50 to 300 g and further preferably 100 to 250 g per liter of the aprotic organic solvent. When an amount of the PAS based resin in washing exceeds 400 g, the washing efficiency tends to be reduced, and when it is less than 10 g, the economical efficiency is inferior.

The washing temperature is preferably 220 to 300° C., particularly preferably 230 to 270° C. and further preferably 240 to 260° C. When the washing temperature exceeds 300° C., the PAS based resin is decomposed, and when the washing temperature is lower than 220° C., the PAS based resin is not softened or molten.

In the production process of the present invention, the PAS based resin is washed in the manner described above, and then this washing liquid is cooled and/or water is added thereto, whereby the PAS based resin dissolved therein is precipitated from the washing liquid and recovered. In this case, the cooling temperature shall not specifically be restricted as long as it is a temperature at which the PAS based resin forms precipitates, and in general, the cooling temperature is preferably 200° C. or lower, more preferably 150° C. or lower and particularly preferably 100° C. or lower.

When adding water, an addition amount of water may be an amount in which the PAS based resin dissolved forms precipitates. An amount in which a composition of water after adding water is more than 50 mass % based on the solvent such as N-methyl-2-pyrrolidone (NMP) is preferably added, and an amount in which it is more than 80 mass % is more preferably added. The washing liquid in which the PAS based resin is dissolved is preferably concentrated in advance by subjecting to operation such as distillation.

Means which have so far been used for solid-liquid separation such as centrifugal separation, filtration and still standing separation can be used as a method for separating and recovering the PAS based resin precipitated in the above manner. The PAS based resin separated may be added as it stays in a wet state to the PAS based resin to be subjected to next washing or it is dried after washed and recovered in the form of the powder-like PAS based resin, and it can be mixed with the PAS based resin of the product.

A process shown in FIG. 1 in which polymerization and washing of the PAS based resin are repeated several times can be illustrated as the application of the present invention. For example, a continuous process in which the PAS based resin is obtained by polymerization and then washed with a mixed solvent (washing solvent) of an aprotic organic solvent and water (B: washing 1) and in which the PAS based resin partially dissolved in the above washing liquid is precipitated, recovered (I: polymer 2) and recycled directly to a melting washing system (Case 1). Further, a process in which the polymer 2 is refined, dried and then mixed with a polymer 1 obtained passing through washing treatment can be arranged in a certain case (Case 2).

EXAMPLES

Next, the present invention shall be explained in further details with reference to examples, but the present invention shall by no means be restricted by these examples. In this case, "%" is based on mass unless otherwise described.

Comparative Example

An autoclave having a capacity of 1 liter was charged with 25.0 g (0.544 mole) of lithium sulfide, 80.0 g (0.544 mole) of p-dichlorobenzene, 1.14 g (0.0272 mole) of lithium hydroxide monohydrate, 4.41 g (0.245 mole) of water and 235 milliliter of N-methyl-2-pyrrolidone (NMP) to carry out polymerization reaction at the temperature of 260° C. for 3 hours.

After finishing the reaction, an ammonium chloride aqueous solution (ammonium chloride: 2.33 g and water: 28.7 g) and 28.7 g of N-methyl-2-pyrrolidone (NMP) were added thereto, and the solution was stirred at the temperature of 260° C. for 10 minutes. After ten minutes passed since stopping to stir, the liquid phase was drawn out from an inner pipe. Subsequently, an NMP-water mixed solvent (NMP: 236 milliliter; water: 33.6 g) was added to the autoclave, and the autoclave was heated again. When reaching to the temperature of 260° C., the solution was stirred to wash for 10 minutes, and after ten minutes passed since stopping to stir, the liquid phase was drawn out from the inner pipe. This washing operation was repeated four times in the same manner. Then, the cover of the autoclave was opened to obtain a cake-shaped refined polyphenylene sulfide resin. This polyphenylene sulfide resin was crushed, and remaining NMP was removed by vacuum drying.

A yield of the polyphenylene sulfide resin thus obtained was 38.3 g, and it was 65% of the theoretical yield (58.8 g). A residual lithium amount in the polyphenylene sulfide resin was 10 ppm or less.

Example 1

In the Comparative Example described above, the whole amount of the washing liquid drawn out from the inner pipe by the washing operations of four times was recovered to result in summing to 1380 g. The above washing liquid was cooled down to the temperature of 50° C. in order to precipitate the polyphenylene sulfide resin. Then, the above precipitate was centrifugally separated by subjecting to a centrifugal separator to obtain 57.5 g of the polyphenylene sulfide resin staying in a wet state. The liquid content thereof was 80%, and therefore the polyphenylene sulfide resin recovered was 11.76 g in terms of a dry mass.

Next, the polymerization reaction of p-dichlorobenzene was carried out on the same conditions by the same method, and when adding the ammonium chloride aqueous solution (ammonium chloride: 2.33 g; water: 28.7 g) and 28.7 g of NMP, added was 57.5 g of the polyphenylene sulfide resin staying in a wet state which was recovered previously. The subsequent washing operation was carried out on the same conditions by the same method to obtain the cake-shaped refined polyphenylene sulfide resin. A yield of the polyphenylene sulfide resin thus obtained was 47.8 g, and it was 81% of the theoretical yield (58.8 g). A residual lithium amount in the above polyphenylene sulfide resin was 10 ppm or less.

Example 2

The polymerization of p-dichlorobenzene and the subsequent washing operation were carried out in the same manner as in Comparative Example to recover the whole amount of 1380 g of the washing liquid drawn out from the inner pipe by the washing operations of four times. This recovered washing liquid was distilled under reduced pressure to remove 920 g of a fraction comprising water and NMP as principal components. The distillation residue was cooled to the temperature of 100° C. or lower, and 1840 g of water was added to precipitate a polyphenylene sulfide resin. In this case, an amount of water added was an amount corresponding to 82% based on NMP. Then, the above precipitate was centrifugally separated by subjecting to a centrifugal separator to obtain 96.5 g of the polyphenylene sulfide resin staying in a wet state. The liquid content thereof was 80%, and therefore the polyphenylene sulfide resin recovered was 19.3 g in terms of a dry mass.

Next, the polymerization reaction of p-dichlorobenzene was carried out on the same conditions by the same method as in Comparative Example, and 96.5 g of the polyphenylene sulfide resin recovered above staying in a wet state and 300 milliliter of NMP were added to the autoclave for the first washing in place of adding the NMP-water mixed solvent (NMP: 236 ml and water: 33.6 g) to carry out the first washing operation. Thereafter, obtained was the polyphenylene sulfide resin refined on the same conditions by the same method as in Comparative Example. A yield of the polyphenylene sulfide resin thus obtained was 53.3 g, and it was 91% of the theoretical yield (58.8 g). The residual lithium amount was 10 ppm or less.

Example 3

The polymerization of p-dichlorobenzene and the washing operation were carried out in the same manner as in Example 2, and 1380 g of the washing liquid recovered was distilled under reduced pressure to remove 920 g of a fraction comprising water and NMP as principal components. The distillation residue was cooled to the temperature of 100° C. or lower, and 1840 g of water was added to precipitate a polyphenylene sulfide resin. In this case, an amount of water added was an amount corresponding to 82% based on NMP. Then, the above precipitate was centrifugally separated by subjecting to a centrifugal separator to obtain 96.5 g of the polyphenylene sulfide resin staying in a wet state. The liquid content thereof was 80%, and therefore the polyphenylene sulfide resin recovered was 19.3 g in terms of a dry mass. This was washed twice with 1840 g of hot water and then dried at the temperature of 120° C. to obtain 17.8 g of the polyphenylene sulfide resin. A residual lithium amount in the above polyphenylene sulfide resin was 10 ppm or less.

On the other hand, obtained was 38.3 g of the polyphenylene sulfide resin which was refined passing through the washing operations of four times described above. This resin and the polyphenylene sulfide resin obtained above by recovering amounted to 56.1 g, and it means that the resin could be recovered at a yield of 95% based on the theoretical yield (58.8 g).

INDUSTRIAL APPLICABILITY

According to the production process of the present invention, alkali metal halides can effectively be removed from the polyphenylene sulfide resin without nearly losing the above resin, and the refined polyphenylene sulfide resin can be obtained at a high yield.

What is claimed is:

1. A process for the production of a polyarylene sulfide based resin comprising washing said polyarylene sulfide based resin in a softened or molten state with a washing liquid comprising water and at least one aprotic organic solvent, wherein polyarylene sulfide based resin dissolved in the washing liquid is recovered by precipitating and separating it from said washing liquid by at least one technique selected from the group consisting of cooling the washing liquid after washing or adding water to the washing liquid after washing.

2. The process according to claim 1, further comprising adding another polyarylene sulfide based resin; and washing with a mixed solvent of an aprotic organic solvent and water in a softened or molten state.

3. The process according to claim 1, further comprising crushing the recovered polyarylene sulfide based resin;
   drying it; and
   reusing in the form of powder.

4. The process as claimed in claim 1, wherein said polyarylene sulfide based resin is a polyphenylene sulfide resin.

5. The process as claimed in claim 1, wherein the polyarylene sulfide based resin is a homopolymer or a copolymer comprising 70 mole % or more of a para-arylene sulfide repeat unit.

6. The process as claimed in claim 1, wherein said washing liquid comprises at least one aprotic organic solvent selected from the group consisting of N,N-dimethylformamide, N,N-diethylformamide, N,N-dimethylacetamide, N,N-diethylacetamide, N,N-dipropylacetamide and N,N-dimethylbenzoamide, caprolactam, N-alkylcaprolactams such as N-methylcaprolactam, N-ethylcaprolactam, N-isopropylcaprolactam, N-isobutylcaprolactam, N-n-propylcaprolactam, N-n-butycaprolactam and N-cyclohexylcaprolactam, N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone and N-methyl-3-ethyl-2-piperidone, tetramethylurea, N,N'-dimethylethyleneurea and N,N'-dimethylpropyleneurea, dimethyl sulfoxide, diethyl sulfoxide, diphenylsulfolane, 1-methyl-1-oxosulfolane, 1-ethyl-1-oxosulfolane and 1-phenyl-1-oxosulfolane, 1-methyl-1-oxophosphorane, 1-n-propyl-1-oxophosphorane and 1-phenyl-1-oxophosphorane, and mixtures thereof.

7. The process as claimed in claim 1, wherein said washing liquid comprises N-methyl-2-pyrrolidone.

8. The process as claimed in claim 1, wherein said washing liquid has a mixing ratio of aprotic organic solvent to water of 55/45 to 95/5.

9. The process as claimed in claim 1, wherein said washing liquid has a mixing ratio of aprotic organic solvent to water of 65/35 to 90/10.

10. The process as claimed in claim 1, wherein the amount of polyarylene sulfide based resin washed is 10 to 400 g per liter of the aprotic organic solvent.

11. The process as claimed in claim 1, wherein washing is accomplished at a washing temperature of 220 to 300° C.

12. The process as claimed in claim 1, wherein the polyarylene sulfide based resin dissolved in the washing liquid is recovered by precipitating and separating it from said washing liquid by cooling the washing liquid after washing to a cooling temperature of 150° C. or lower.

13. The process as claimed in claim 1, wherein the polyarylene sulfide based resin dissolved in the washing liquid is recovered by precipitating and separating it from said washing liquid by adding water to the washing liquid after washing.

14. The process as claimed in claim 1, wherein the amount of polyarylene sulfide based resin washed is 50 to 300 g per liter of the aprotic organic solvent.

15. The process as claimed in claim 1, wherein the amount of polyarylene sulfide based resin washed is 100 to 250 g per liter of the aprotic organic solvent.

16. The process as claimed in claim 1, wherein said washing liquid comprises N-methyl-2-pyrrolidone, said washing liquid has a mixing ratio of aprotic organic solvent to water of 55/45 to 95/5, and the amount of polyarylene sulfide based resin washed is 10 to 400 g per liter of the aprotic organic solvent.

* * * * *

UNITED STATES PATENT AND TRADEMARK OFFICE
CERTIFICATE OF CORRECTION

PATENT NO. : 7,317,072 B2
APPLICATION NO. : 10/530027
DATED : January 8, 2008
INVENTOR(S) : Minoru Senga et al.

It is certified that error appears in the above-identified patent and that said Letters Patent is hereby corrected as shown below:

On the title page, Item (86), the PCT No. Item (86) should read as follows:

-- PCT No.:       PCT/JP03/12667

§ 371 (c)(1),
(2), (4) Date:     Sep. 22, 2005 --

Signed and Sealed this

Twenty-ninth Day of April, 2008

JON W. DUDAS
*Director of the United States Patent and Trademark Office*